United States Patent [19]
Kramer

[11] 4,029,168
[45] June 14, 1977

[54] STEERING COLUMN LOCK INHIBITOR

[75] Inventor: Richard L. Kramer, Saginaw, Mich.

[73] Assignee: General Motors Corporation, Detroit, Mich.

[22] Filed: July 14, 1975

[21] Appl. No.: 595,624

[52] U.S. Cl. .................................. 180/114; 70/252
[51] Int. Cl.² ........................................ B60R 25/02
[58] Field of Search ...................... 180/114; 70/252

[56] References Cited
UNITED STATES PATENTS

| | | | |
|---|---|---|---|
| 3,490,255 | 1/1970 | Wight | 70/252 |
| 3,572,067 | 3/1971 | Kimberlin | 70/252 |
| 3,638,462 | 2/1972 | White | 70/252 X |
| 3,648,490 | 3/1972 | Kimberlin | 70/252 X |
| 3,703,092 | 11/1972 | Elliott | 180/114 X |
| 3,789,636 | 2/1974 | Nakashima | 70/252 |
| 3,791,182 | 2/1974 | Oxley | 70/252 |

*Primary Examiner*—John P. Silverstrim
*Attorney, Agent, or Firm*—Charles R. White

[57] ABSTRACT

A steering column lock inhibitor for fixed and adjustable steering columns preferably without a shifting function. In one position, the inhibitor limits linear movement of an actuator rod in a first direction to prevent locking of the steering wheel while allowing linear movement in an opposite direction for actuation of the ignition and starter switch. In a second position the inhibitor allows linear movement of the rod in the first direction for steering wheel locking while limiting movement in an opposite direction so that the ignition and starter switch cannot be actuated.

2 Claims, 7 Drawing Figures

STEERING COLUMN LOCK INHIBITOR

This invention relates to inhibitors to control movement of actuator devices and more particularly to a new and improved lock inhibitor for adjustable and stationary steering columns mounted adjacent to an ignition switch and manually movable to permit movement of an actuator so the steering wheel can be locked.

Prior to the present invention, vehicle steering columns have been provided with manual devices which normally inhibit the locking of a steering wheel by a key operated actuator assembly. This manual device can be depressed so that the actuator assembly, which also controls the engine starter, can be rotated in a direction to effect the locking of the vehicle steering wheel to prevent unauthorized vehicle use and theft. While these prior art devices have been satisfactory for their intended purposes, they are generally not suitable for use on adjustable steering columns, such as a tilt or tilt and telescoping steering column.

Accordingly, it is a feature, object and advantage of this invention to provide a new and improved lock inhibitor for fixed and adjustable steering columns that incorporates a blocking device mounted in a shroud of the column which obstructs the travel of an actuator rod for the ignition switch and steering wheel lock bolt. The inhibitor can be manually rotated to permit the actuator rod to travel to the lock position but if held in a depressed position the inhibitor will prevent the actuator from traveling into the engine start position.

Another feature, object and advantage of this invention is to provide a new and improved steering column which preferably does not incorporate a shifting function but includes a partially circular inhibitor normally positioned to prevent the inadvertent movement of a locking bolt into position to lock the steering wheel from turning movement. By rotating the inhibitor, steering wheel locking can be obtained. To improve the versatility of this invention and make it usable on fixed as well as adjustable steering columns, new and improved connector means are provided to permit the inhibiting function while allowng steering column adjustment.

Another feature of this invention is the provision of a steering column lock having a lock bolt assembly cooperable with a keeper on a steering shaft component of a steering column, a control switch for the vehicle electrical ignition starter and accessory systems and a key operated cylinder lock actuator mounted on the steering column and connected operatively with both the steering column lock and the control switch for simultaneous actuation thereof by selected key rotation of the actuator, the actuator being permitted normal rotation to selectively unlock the steering shaft and energize the electrical systems but being prevented from inadvertent reverse rotation to place the steering lock bolt in locked position, except upon a conscious preparatory actuation of a blocking lever normally located within the path of an actuator for the lock bolt assembly.

A further feature, object and advantage of this invention is the provision of a new and improved blocking lever disposed adjacent to a key operated actuator in such a position as to require a deliberate manual effort to remove the blocking lever from blocking position yet conveniently close enough so that the blocking lever may be depressed by one of the fingers of the operator's hand while the fingers of the same hand simultaneously rotate the cylinder lock actuator.

Still another feature, object and advantage of this invention is to provide a new and improved lock inhibitor which has limited rotation about the axis of the vehicle steering column and is provided with means for preventing foiling of the blocking function of the blocking lever as by permanently affixing the inhibitor in an unblocked position, specifically the provision of a blocking wall in one end of a slot which engages an actuator and serves to prevent manipulation of the cylinder lock actuator to some normal position other than locking position such as that for energizing the ignition or for starting the vehicle engine.

These and other features, objects and advantages of the invention will be readily apparent from the following detailed description and drawing in which.

Figure 1:
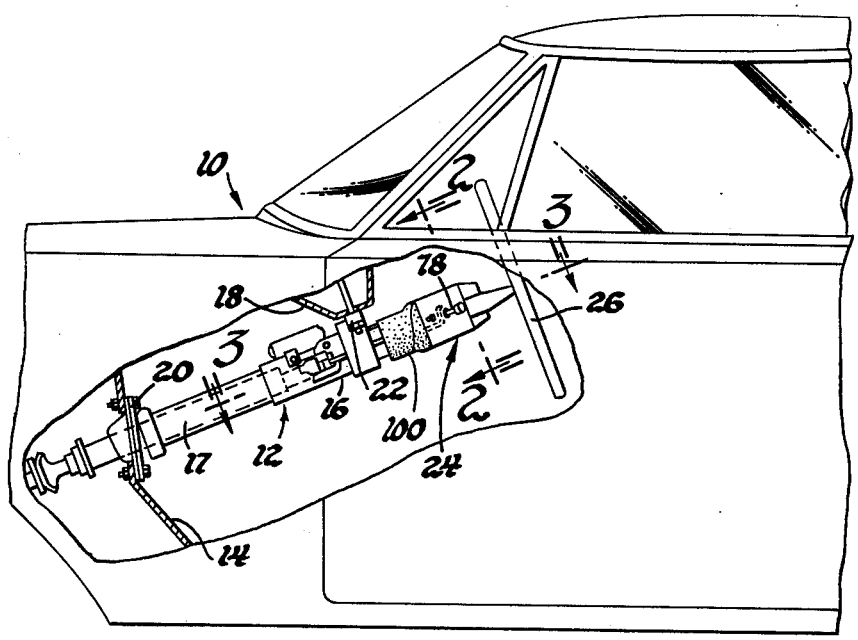
FIG. 1 is a fragmentary partially broken away view of a vehicle body incorporating a steering column and a steering column lock according to this invention.
Figure 2:
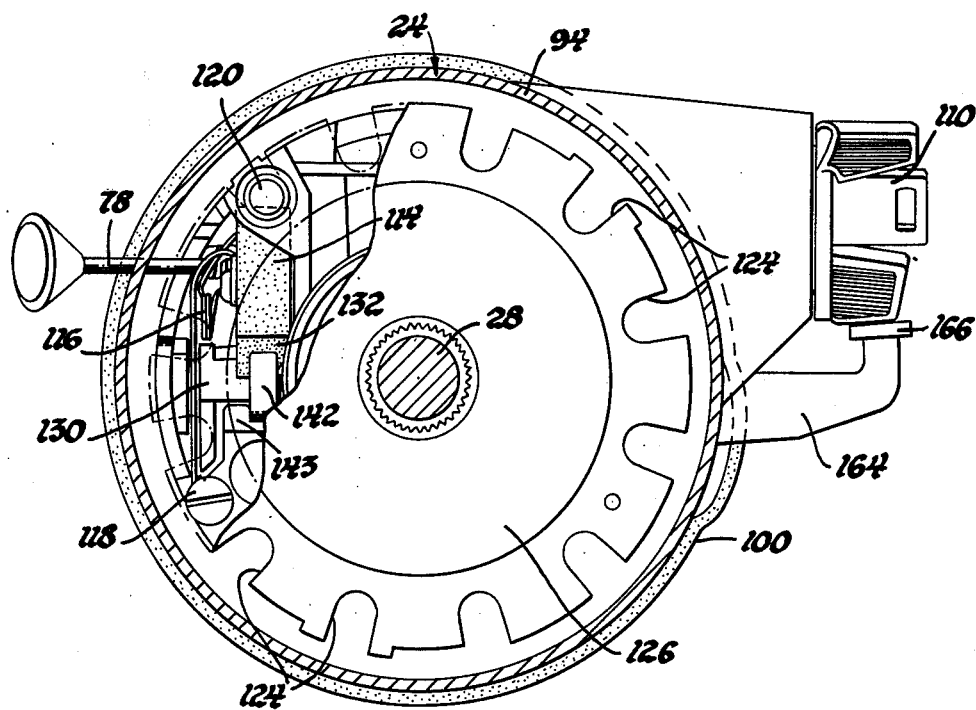
FIG. 2 is an enlarged sectional view taken along the plane indicated by line 2—2 of FIG. 1.

With particular reference to FIG. 1 of the drawing there is shown a vehicle body 10 which has within its passenger compartment a steering column assembly 12 which projects forwardly through a firewall 14 into connection with the vehicle steering gear in the vehicle engine compartment. The steering column 12 includes upper and lower jackets 16 and 17 with lower jacket 17 secured to the firewall 14 by bracket 20 and the upper jacket 16 secured to instrument panel construction 18 by bracket 22. The steering column incorporates an angularly tiltable head 24 having a steering wheel 26. The head 24 and connected steering wheel 26 are adjustable as a unit to predetermined angular positions to facilitate vehicle entry and exit by the driver and to maximize driver comfort by permitting the driver to place the steering wheel at a convenient angle when driving the vehicle.

The steering wheel 26 is operatively connected to an angularly adjustable upper steering shaft 28 of a steering shaft assembly 30 that extends axially within the steering column assembly 12. In addition to the upper steering shaft 28, the steering shaft assembly 30 includes a lower steering shaft 32 operatively connected to the upper steering shaft by universal joint 34 which permits the upper steering shaft to be angularly adjusted with respect to the lower shaft 32. The lower steering shaft is operatively connected to the steering gear (not shown) so that the steering wheel 26 can be turned to turn the dirigible wheels of the vehicle. The upper end of the lower steering shaft 32 projects axially through a generally cylindrical support assembly 36 which is secured by screws 38 to a retainer (not shown) connected to the upper jacket 16. A cylindrical bearing housing 40 is mounted on the upper steering shaft 28 by antifriction bearings 42,44 and projects forwardly to a terminal position around the support assembly 36. The bearing housing 40 is connected to the support assembly 36 by pivot pins 46 and 48 and thus can be pivoted to a limited extent as will be further explained below with respect to the pivot axis provided by the pins 46 and 48. The bearing housing 40 has a pair of locking shoes 50 and 52 each having a longitudinally extending toothed portion 54,56 for selective engagement with a lock shoe pin 58 secured in the support assembly 36.

Figure 4:
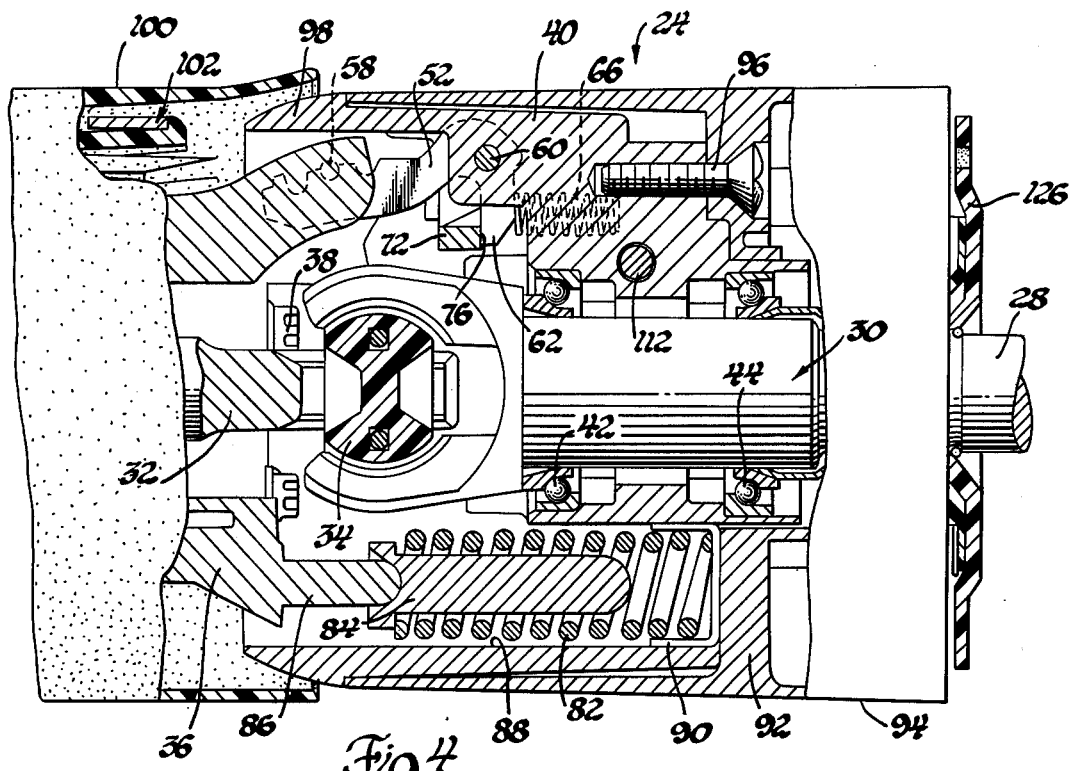
FIG. 4 is a sectional view taken along line 4—4 of FIG. 3.

The lock shoes 50 and 52 are generally L-shaped in side view and are pivotally mounted to the bearing housing 40 by pivot pin 60. Each lock shoe has a depending leg 62,64 which are engaged by springs 66,68 respectively seated in bearing housing 40 that urge the lock shoes toward engagement with lock shoe pin 58. When pin 58 is engaged with one of the teeth of either one of the lock shoes 50,52 the angular setting between the bearing housing 40 and support assembly 36 is fixed. The lock shoes may be moved from engagement with the lock shoe pin by actuation of a shoe release lever 72 which is pivotally mounted to bearing housing 40 by pivot pin 74. This lever has an inner edge 76 which directly contacts the depending leg 62 and 64 of the locking shoes so that an unlocking lever 78 fixed to one end of the shoe release lever 72 and extending laterally from the steering column assembly can be manually actuated by a vehicle operator to swing the shoe release levers in a counterclockwise direction in FIG. 4. This causes the locking shoes to pivot on pivot pin 60 away from locking engagement with shoe lock pin 58. A spring 80 seated in the bearing housing 40 engages the inner ends of the shoe release lever 72 yieldably urging lever 72 in a counterclockwise direction. This is opposed by the spring 66 and 68 which maintain the locking shoes in their locked position until overcome by manual effort applied through lever 78.

A large compression spring 82 is employed to urge the tiltable head 24 of the steering column upwardly and about pivot pins 46,48 when lever 72 is actuated and the locking shoes are released from pin 54. The compression spring 82 is mounted on a spring guide 84 seated on an extended proturberance 86 of the support assembly 36. Spring 82 is a helical spring which surrounds the spring guide 84 and projects axially through a bore 88 in bearing housing 40 and into engagement with a cup-like spring retainer 90. This spring retainer is secured in housing 40 by a bayonet type fastener means not shown below radial wall 92 of a cylindrical cover 94 of the upper head 24. This cover is attached to the bearing housing 40 by cover screws 96 which are threaded into the bearing housing 40. The cylindrical outer wall of cover 94 extends around the outside of the bearing housing 40 and terminates short of the inwardly tapered end 98 of the bearing housing 40 which projects into the end of a cylindrical plastic shroud 100 that is rigidly secured to the jacket 16.

Figure 3:
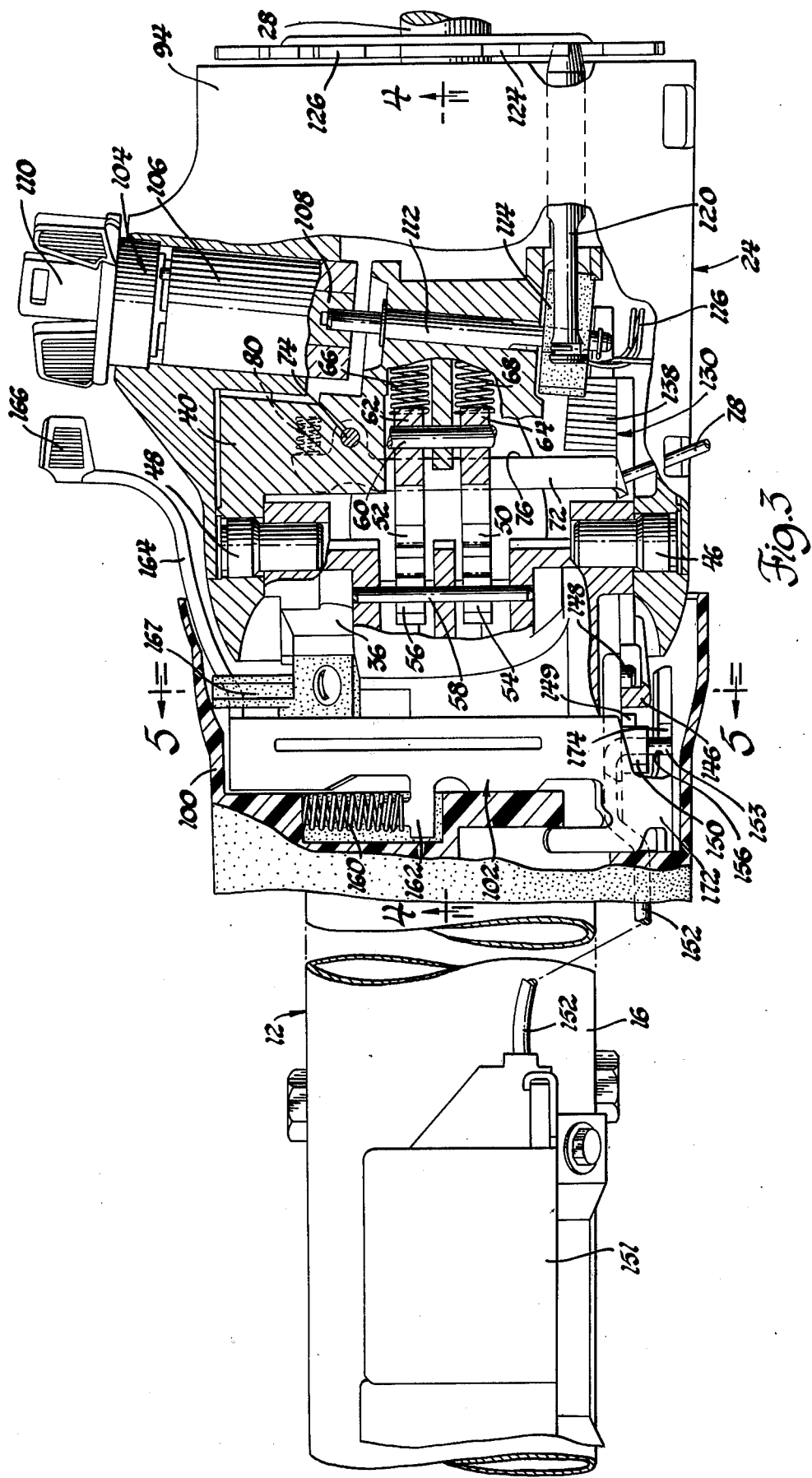
FIG. 3 is a longitudinal sectional view taken along line 3—3 of FIG. 1 showing the position of the parts in the locked position.

The shroud 100 houses a circular key lock inhibitor 102 which normally prevents the mechanical locking of the steering wheel 26 but which is manually movable to permit the steering wheel to be locked under certain conditions as will be explained. As shown in FIG. 3 there is a key operated lock actuator assembly 104 supported by the tiltable head 24. The assembly 104 includes a conventional ignition lock cylinder 106 that has a cylinder core 108 provided with suitable tumblers which is operated by a removable key 110. With key 110 inserted into the lock actuator assembly, the cylinder core 108 can be turned in either direction to turn a drive shaft 112 mounted for limited rotation in the bearing housing 40.

As shown, the drive shaft 112 has one end operatively connected to core 108 and extends from core 108 into driving engagement with a sector gear 114. A lock bolt spring 116, having one end secured by screw 118 to bearing housing 40 an intermediate portion extending into a recess in the sector gear 114, and the other end secured to an extending rear portion of a locking bolt 120, is actuated by the sector gear so that counterclockwise rotation of the key 110 and the sector gear drivingly connected thereto will permit the spring to bias the locking bolt 120 axially into engagement with one of the openings 124 in the peripheral edge of locking plate 126. This locking plate is splined or otherwise secured to the upper steering shaft 28 and turns with that shaft and connected steering wheel 26. Assuming that the ignition key has been turned to the accessory on-steering wheel lock position or to the ignition off-steering wheel lock position, and the locking bolt is not aligned with one of the openings in plate 126, spring 116 will provide the force to snap the lock bolt into one of the peripheral openings when the locking plate 126 is turned with the steering wheel until the bolt and one of the openings are aligned.

Figure 7:
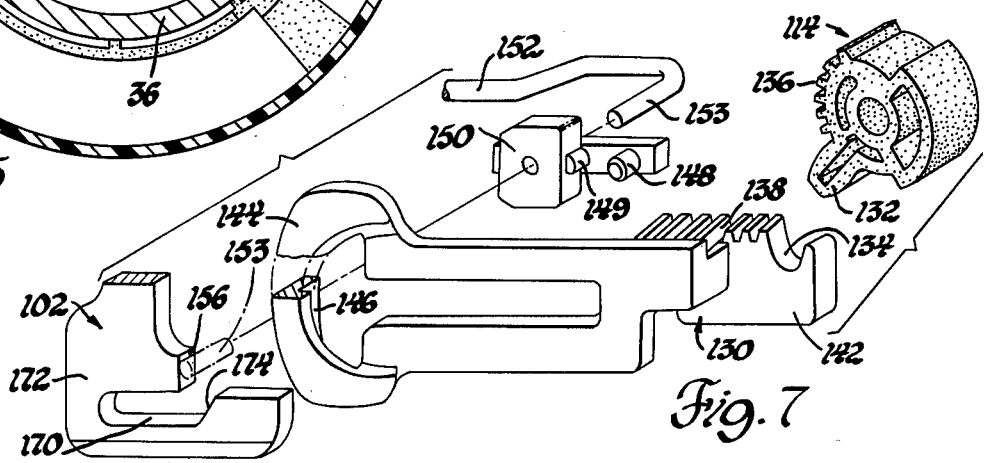
FIG. 7 is a perspective view of the ignition switch rack and associated components used in this invention.

In addition to actuating locking bolt 120 through the lock bolt spring, the sector gear 114 actuates an ignition switch rack 130 mounted for sliding movement in the bearing housing 40. As shown in FIG. 7 the gear 114 has a depending finger 132 which fits in a corresponding recess 134 formed in the ignition switch rack and has teeth 136 which are adapted to mesh with the teeth 138 of ignition switch rack 130. By this construction the clockwise rotation of key 110 and the sector gear drivingly connected thereto causes the rack 130 to be longitudinally moved upwardly toward the steering wheel 26. At this time the locking pin or bolt, having its headed end engaged by a peripheral shoulder on the sector gear as best shown in FIG. 3 is being moved longitudinally in an opposite direction away from engagement with the locking plate by the sector gear. An opposite rotation of gear 114 actuates the spring 116 which biases the locking bolt toward engagement with the recesses in the locking plate.

Figure 6:
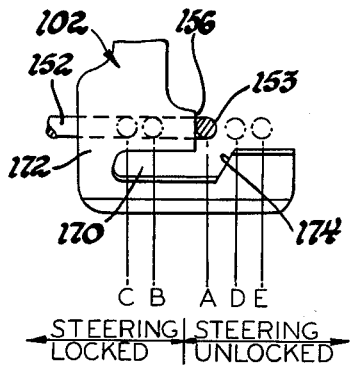
FIG. 6 is a view taken along line 6—6 of FIG. 5.

The ignition switch rack 130 has an integral slide portion 142 mounted for longitudinal movement in a track 143 integrally formed in bearing housing 40. The ignition switch rack 130 terminates in an enlarged head portion 144 formed with an arcuate wall 146. This wall fits between projecting pins 148 and 149 of a connector 150 that couples the rack 130 with an elongated ignition switch rod 152 which is operatively connected to a conventional ignition and starter system switch 151 mounted on the upper jacket 16. The upper end 153 of the switch rod 152 is bent at right angles with respect to the elongated major portion of the rod and extends through the connector 150 normally into alignment with abutment shoulder 156 of the circular lock inhibitor 102. As long as the inhibitor 102 is in the position illustrated in FIG. 7 the key 110 cannot be turned in a counterclockwise direction from the ignition offsteering wheel unlock position to accessory on-steering wheel lock position or to the ignition off-steering wheel lock position. In this position of the inhibitor the key cannot be used to lock the steering wheel 26 and the steering wheel is free to be used in turning the dirigible wheels of the vehicle. The key 110 however can be turned in a clockwise direction to move the ignition switch rod 152 upwardly to the engine start-steering wheel unlock position or to the ignition on-steering wheel unlock position. In FIG. 6, for example, A represents the circular end of the bent portion 153 of the rod 152 in engagement with the abutment shoulder 156 of the inhibitor 102. As shown in this figure the switch rod 152 cannot be moved downwardly past shoulder 156 by actuation of key 110 to position B representing ignition off-steering wheel lock or to position C corresponding to accessory on-steering wheel lock. However, the key can be turned in a clockwise direction to move rod 152 upwardly so that the end of the rod is positioned at D corresponding to ignition on-steering wheel unlocked or position E corresponding to engine start-steering wheel unlock.

Figure 5:
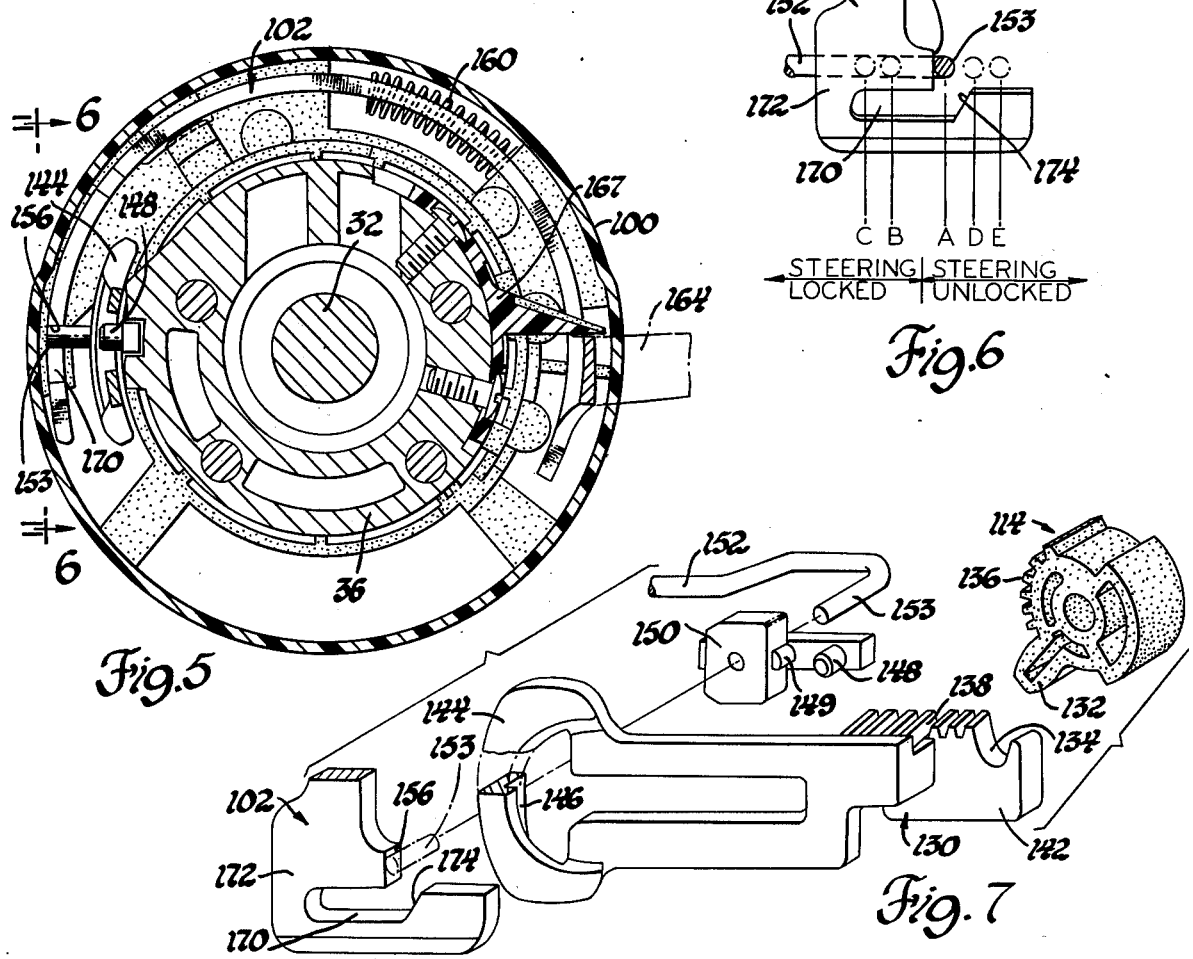
FIG. 5 is a view taken along line 5—5 of FIG. 3.

The inhibitor 102 is biased to the blocking position of FIG. 5 by helical compression spring 160 which is supported in the shroud 100 and which is seated on a spring retainer 162 extending laterally from the inhibitor 102. The inhibitor has an integral lever portion 164 extending upwardly from the circular portion thereof which terminates in a finger rest 166 closely adjacent the key 110. A stop 167 bolted to support assembly 36 contacts the lever 164 to limit rotation of inhibitor 102 by spring 160. With this construction the operator can contact the rest 166 with one of his fingers and manually depress the lever as the other fingers rotate the key in a counterclockwise direction. This rotational movement of the lever moves the slot 170 in the enlarged portion of the head 172 of the inhibitor into alignment with the end 153 of the switch rod 152. Under these conditions and with clearance provided by slot 170, the key can be turned counterclockwise to the ignition off-steering wheel lock position corresponding to position B or to accessory onsteering wheel lock position corresponding to position C in FIG. 7. The slot 170 terminates in a shoulder 174 which limits the upward movement of the rod 152 when the lever is depressed so that the ignition on-steering wheel unlock or engine startsteering wheel unlock conditions cannot be obtained. Accordingly, the function of the inhibitor cannot be defeated by rotating and holding the inhibitor in the FIG. 6 position.

It will be appreciated that this inhibitor functions at any tilt position of the steering wheel with the arcuate wall 146 extending between the projections 148 and 149. It will be further appreciated that this invention is usable with telescoping, tilting and telescoping, as well as stationary type steering columns. Preferably the steering column does not incorporate any transmission controls and thus has no shift function.

While a preferred construction has been shown and described to illustrate the invention, other embodiments will be now apparent to those skilled in the art. Accordingly, the scope of this invention is set forth in the following claims.

I claim:

1. In a vehicle steering column, a support assembly secured at the upper end of said column, a tiltable head portion, pivot means pivotally connecting said head portion to said support assembly, a tiltable manual steering wheel operatively mounted adjacent to the upper end of said head portion, rotatable steering shaft means extending through said head portion and said support assembly and operatively connected to said steering wheel, said steering shaft means having pivot means therein to permit said head portion and said steering wheel to be tilted, ignition switch means operatively mounted on said column below said support assembly, a key actuated operator assembly rotatably mounted in said head portion of said steering column, locking bolt means in said head portion longitudinally movable in a first direction for locking said steering wheel and steering shaft means from rotation in response to a first predetermined rotary movement of said operator assembly, said locking bolt means movable longitudinally in a second direction for unlocking said steering wheel and steering shaft means in response to a second and opposite predetermined rotary movement of said operator assembly, said operator assembly having gear means fixed thereto, rack means drivingly connected to said gear means and longitudinally movable thereby in said first and second directions, ignition switch rod means, arcuate track means interconnecting said ignition switch rod means and said rack means to permit said head portion and said steering wheel to be tilted with respect to said support assembly, said switch rod means being movable in said first direction to close said ignition switch means as said locking bolt means is moved in said second direction, said switch rod means being further longitudinally movable in said second direction to open said ignition switch means as said locking bolt means is moved in said first direction, a locking bolt inhibitor mounted for limited rotation within said column, said inhibitor having a manual lever extending to a terminal point closely adjacent to said key actuated operator assembly, said switch rod means terminating in an abutment end portion, said inhibitor having an abutment shoulder normally positioned to engage said abutment end portion and thereby limit movement of said ignition switch rod means in said second direction and thereby prevent rotary movement of said operator assembly in one direction and the resultant locking movement of said locking bolt means in said first direction, said inhibitor having slot means adjacent said shoulder which accommodates said abutment end portion and permits movement of said ignition switch rod means in said second direction when said inhibitor is rotated to a predetermined position by manually depressing said lever, and said slot means having a contact surface at one end thereof which contacts said abutment end portion and inhibits movement of said ignition switch rod means in said first direction to close said ignition switch means.

2. In a vehicle steering column, a support assembly secured at the upper end of said column, a tiltable head portion, pivot means pivotally connecting said head portion to said support assembly, a tiltable manual steering wheel operatively mounted adjacent to the upper end of said head portion, rotatable steering shaft means extending through said head portion and said support assembly and operatively connected to said steering wheel, said steering shaft means having a universal joint therein to permit said head portion and said steering wheel to be tilted, ignition switch means operatively mounted on said column below said support assembly, a key actuated operator assembly rotatably mounted in said head portion of said steering column, locking bolt means in said head portion movable in a first direction for locking said steering wheel and steering shaft means from rotation in response to a first predetermined rotary movement of said operator assembly, said locking bolt means movable in a second direction for unlocking said steering wheel and steering shaft means in response to a second and opposite predetermined rotary movement of said operator assembly, rack means operatively connected to said operator assembly and movable thereby in said first and second directions, ignition switch rod means, arcuate track and cooperating pin means adjustably interconnecting said switch rod means and said rack means to permit said head portion and said steering wheel to be tilted with respect to said support assembly, said switch rod means being movable in said first direction to close said ignition switch means as said locking bolt means is moved in said second direction, said switch rod means being further movable in said second direction to open said ignition switch means as said locking bolt means is moved in said first direction, a shroud surrounding a portion of said steering column below said support assembly, a circular locking bolt inhibitor mounted for limited rotation between blocking and clear positions within said shroud, said inhibitor having a manual lever extending to a terminal point closely adjacent to said key actuated operator assembly, said inhibitor having an abutment shoulder to engage and limit movement of said ignition switch rod means in said second direction and thereby prevent rotary movement of said operator assembly in one direction and the resultant locking movement of said locking bolt means in said first direction, spring means in said shroud for biasing said inhibitor to a blocking position in which said shoulder engages said ignition switch rod means, said inhibitor having slot means adjacent to said shoulder which permits movement of said ignition switch rod means in said second direction when said inhibitor is rotated to the clear position by manually depressing said lever, and said slot means having a contact surface at one end thereof which inhibits movement of said ignition switch rod means in said first direction to close said ignition switch means.

* * * * *